(12) United States Patent
Riell

(10) Patent No.: US 8,924,734 B2
(45) Date of Patent: Dec. 30, 2014

(54) KEY AND METHOD FOR ENTERING COMPUTER RELATED PASSWORDS VIA A MNEMONIC COMBINATION

(75) Inventor: Matthew Riell, Charlotte, NC (US)

(73) Assignee: Synaptilogix LLC, Charlotte, NC (US)

( * ) Notice: Subject to any disclaimer, the term of this patent is extended or adjusted under 35 U.S.C. 154(b) by 15 days.

(21) Appl. No.: 13/313,067

(22) Filed: Dec. 7, 2011

(65) Prior Publication Data

US 2013/0151859 A1    Jun. 13, 2013

(51) Int. Cl.
| | | |
|---|---|---|
| G06F 21/00 | (2013.01) | |
| G06F 1/26 | (2006.01) | |
| G08B 13/00 | (2006.01) | |
| G08B 29/00 | (2006.01) | |
| G06F 15/16 | (2006.01) | |

(52) U.S. Cl.
USPC .............. 713/182; 713/184; 726/36; 709/248

(58) Field of Classification Search
USPC ........ 726/9, 20, 2–8; 713/168–174, 182–186, 713/202; 709/206, 225, 229, 249, 389
See application file for complete search history.

(56) References Cited

U.S. PATENT DOCUMENTS

| | | |
|---|---|---|
| 4,599,489 A | 7/1986 | Cargile |
| 5,377,269 A | 12/1994 | Heptig et al. |
| 5,836,010 A | 11/1998 | Kim |
| 6,611,914 B1 | 8/2003 | Lee et al. |
| 7,181,626 B1 | 2/2007 | Rasmussen |
| 7,533,408 B1 | 5/2009 | Arnouse |
| 7,917,949 B2 * | 3/2011 | Conley ............................ 726/20 |
| 2002/0071566 A1 | 6/2002 | Kurn |
| 2004/0210758 A1 | 10/2004 | Jang et al. |
| 2006/0242423 A1 * | 10/2006 | Kussmaul ..................... 713/182 |
| 2008/0036572 A1 * | 2/2008 | Muller ......................... 340/5.82 |
| 2009/0193511 A1 | 7/2009 | Noe et al. |
| 2010/0228991 A1 * | 9/2010 | Billings et al. ................. 713/185 |
| 2011/0010470 A1 * | 1/2011 | Hulbert et al. ................... 710/13 |
| 2011/0042455 A1 | 2/2011 | Lu et al. |
| 2011/0240728 A9 | 10/2011 | Arnouse |

* cited by examiner

*Primary Examiner* — Evans Desrosiers
(74) *Attorney, Agent, or Firm* — Jeffrey Watson; Balser & Grell IP Law, LLC

(57) ABSTRACT

A key for entering computer related passwords via a mnemonic combination includes an electronic key with a communication means, a computer program, a storage unit, and a user interface. The communication means is for communicating with a computer device where the computer device recognizing the electronic key as a human input device. The computer program is for creating a password and a mnemonic combination associated with the password. The storage unit is for storing the password and the mnemonic combination association with the password. The user interface is for allowing a user to enter the mnemonic combination into the electronic key. Wherein, when the user enters the mnemonic combination into the user interface, the electronic key communicating the password associated with the mnemonic combination to the computer device as a human input device.

20 Claims, 7 Drawing Sheets

KEY AND METHOD FOR ENTERING COMPUTER RELATED PASSWORDS VIA A MNEMONIC COMBINATION

FIELD OF THE INVENTION

The instant invention is directed toward a device for entering computer related passwords, and more specifically, to a device or key for entering computer related passwords into a computer by entering a mnemonic combination into said device or key.

BACKGROUND OF THE INVENTION

A password is a string of characters that is used for authentication, to prove identity or gain access to a resource. For example, a Personal Identification Number (aka PIN) is a password. Passwords, by their nature, should be kept secret from those not allowed access. Passwords have been around a long time, however in recent times, user names and passwords are commonly used by people during a log in process that controls access to protected computer operating systems, mobile phones, cable TV decoders, automated teller machines (ATMs), etc.

Despite the name password, there is no need for a password to be actual words, meaning passwords can come in many different forms, including, but not limited to: strings of letters, numbers, words, symbols, etc. Some passwords are formed from multiple words and may more accurately be called a passphrase. The term passcode is sometimes used as a password when the secret information is purely numeric, such as PIN numbers. Passwords are generally short enough to be easily memorized and typed i.e. PIN numbers, passphrases, etc. However, in reality, passwords which are not easily memorized or typed, may be harder to guess or hack, and thus, are highly desirable.

Due to the ever increasing use of computers and the need for computer related authentication, the instant invention is designed to address the problems associated with entering passwords onto a computer, or computer related passwords. A typical computer user may require passwords for many purposes, including, but not limited to: logging into computer accounts, retrieving e-mail from servers, accessing programs, databases, networks, web sites, applications, etc. For example, a computer user may be required to have a password to enter and control their user data on a social media site, like Facebook®. The use of computer related passwords is limitless and can be used for anything requiring authentication via a computer.

However, computer related passwords are known to have many problems. Some of the disadvantages to computer related passwords include the fact that they may be stolen, hacked, forgotten, etc. The easier a password is for the owner to remember generally means it will be easier for an attacker to guess. Passwords which are difficult to remember will reduce the security of a system because users might need to write down or electronically store the password, users will need frequent password resets and, users are more likely to re-use the same password. Similarly, the more stringent requirements for password strength (e.g. having a mix of uppercase and lowercase letters and digits, or change it monthly), the greater the degree to which users will subvert the system. Thus, there is clearly a need to create computer related passwords that are less likely to be stolen, hacked, or forgotten.

One known solution available as a substitute to computer related passwords is a USB dongle that may be used as an authentication device for a computer. These USB dongles are devices that are plugged into a USB port of a computer where the dongle transmits information to the computer to authenticate or allow access to certain programs, applications, etc. However, these USB dongles are designed to eliminate the use of user names and passwords. In addition, these USB dongle type devices create a 2-way communication with the computer device, meaning the USB dongle device can be accessed and hacked by the computer. Thus, there is clearly a need for a device that does not eliminate the use of usernames and passwords and is not accessible by a computer device to be hacked.

The instant invention of a key for entering computer related passwords via a mnemonic combination is designed to address the above mentioned problems.

SUMMARY OF THE INVENTION

The instant invention is directed toward a key for entering computer related passwords via a mnemonic combination. The key includes an electronic key with a communication means, a computer program, a storage unit, and a user interface. The communication means is for communicating with a computer device where the computer device recognizing the electronic key as a human input device. The computer program is for creating a password and a mnemonic combination associated with the password. The storage unit is for storing the password and the mnemonic combination association with the password. The user interface is for allowing a user to enter the mnemonic combination into the electronic key. Wherein, when the user enters the mnemonic combination into the user interface, the electronic key communicating the password associated with the mnemonic combination to the computer device as a human input device.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
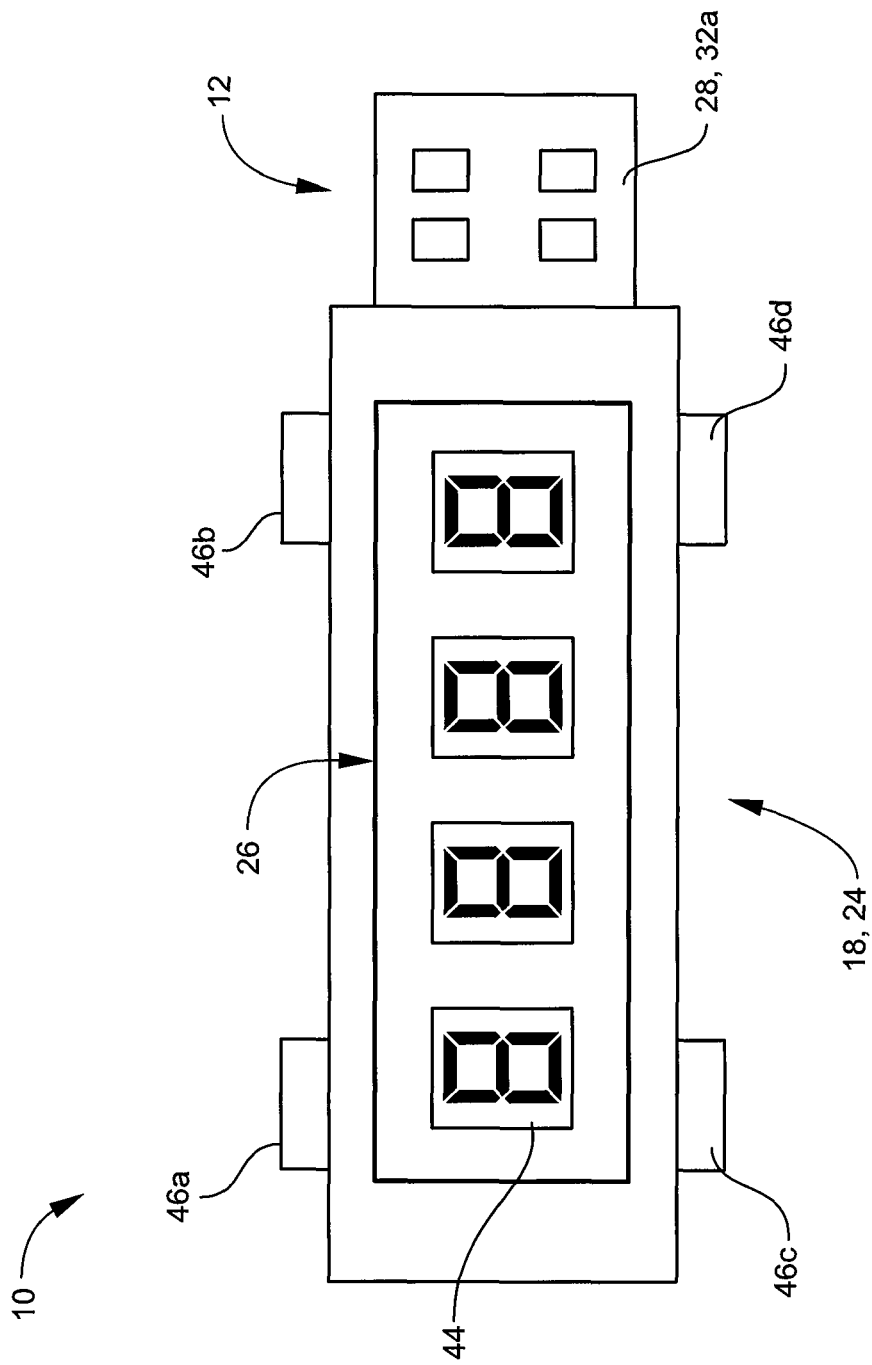
FIG. 1 is a front plan view of an electronic key for entering computer related passwords onto a computer device via a mnemonic combination according to one embodiment of the instant invention.

Referring to the drawings, wherein like numerals indicate like elements, there is shown in FIG. 1 an embodiment of a key 10. Key 10 may be for entering computer related passwords via a mnemonic combination. Key 10 may be any size or shape device capable of entering computer related passwords via a mnemonic combination. Key 10, as described herein, is an electronic key that communicates with a computer for entering computer related passwords via a mnemonic combination. Key 10 may allow a user to enter a mnemonic combination 22 into a user interface 26 on the key 10, whereby the electronic key 10 may communicate a password 20 associated with the mnemonic combination 22 to a computer device 14 as a human input device. As such, the key 10 may be adapted to allow a user to create a password associated with a mnemonic combination whereby the key may be utilized to communicate with the computer device as a human input device and enter the password into the computer device upon the user entering the mnemonic combination into the user interface. Electronic key 10 generally includes, but is not limited to, a communication means 12, a computer program 18, a storage unit 24, and user interface 26.

Communication means 12 may be included in electronic key 10 for entering computer related passwords via a mnemonic combination. See FIGS. 1 and 2. Communications means 12 may be for communicating with a computer device 14. Computer device 14 may be any computer, including, but not limited to, a personal computer (PC), laptop, cell phone, personal digital assistant (PDA), server, etc. Communication means 12 may include any device or means for communicating with computer device 14. Communication means 12 may communicate with computer device 14 where computer device 14 recognizes key 10 as a human input device (HID).

In one embodiment, communication means 12 may communicate with computer device 14 where computer device 14 may recognize key 10 as a keyboard input device. In this embodiment, the communication between computer device 14 and key 10 may be a one way communication where information is only passed from key 10 to computer device 10. This feature of key 10 may prevent the computer device 14 from accessing or hacking the information stored on key 10.

Communication means 12 may include a wired connection 28, a wireless connection 30, and combinations thereof. Wired connection 28 may include any known wired connections for key 10 to communicate with computer device 14 as a HID, including, but not limited to, USB 32a (including standard USB, Mini USB 32b, Micro USB 32c, and Apple Dock Connector 32d), other like wired connections, or any combination thereof. Wireless connection 30 may include any known wireless connections for key 10 to communicate with computer device 14 as a HID, including, but not limited to, Bluetooth 32e, other like wireless connections, or any combination thereof. In one embodiment, key 10 may include a USB 32a wired connection 28 whereby key 10 is powered by the USB 32a wired connection 28 with computer device 14 and requires no battery. In another embodiment, key 10 may include a Bluetooth 32e wireless connection 30 whereby key 10 may include a battery for powering the key 10 and the Bluetooth connection 32e. The battery may be any known batteries for powering electronic devices and may be standard or rechargeable. In yet another embodiment, key 10 may include a Bluetooth 32e wireless connection 30 and a USB 32a wired connection 28. In this embodiment, the key 10 may include a battery which may be charged by connecting the key 10 to the computer device 14 via USB 32a wired connection 28.

Computer program 18 may be included in electronic key 10 for entering computer related passwords via a mnemonic combination. See FIGS. 2-7. Computer program 18 may be for creating password 20 and mnemonic combination 22 being associated with password 20. Computer program 18 may be any computer program for creating a password 20 and a mnemonic combination 22 being associated with the created password 20.

In one embodiment, computer program 18 may be adapted to generate a random password 20a in association with the mnemonic combination 22. In another embodiment, the computer program 18 may be adapted for allowing a user to create a user defined password 20b in association with the mnemonic combination 22.

Password 20 may be entered into computer program 18 and stored in storage unit 24 in key 10. Password 20 may be any password, passphrase, string of letters, numbers, words, symbols, etc. that may be entered into computer program 18 and stored in storage unit 24. Computer program 18 may generate a random password 20a or may allow a user to enter a user defined password 20b (see FIG. 5).

Mnemonic combination 22 may be entered into user interface 26 and stored in storage unit 24 in key 10. Mnemonic combination 22 may be any combination capable of being entered into user interface 26 and stored in storage unit 24. Mnemonic combination may include, but is not limited to, a PIN number combination 34, an alphabetical combination 38, an alpha-numeric combination 36, a symbol combination 40, a gesture combination 42, other like combinations, and combinations thereof.

Storage unit 24 may be included in electronic key 10 for entering computer related passwords via a mnemonic combination. See FIGS. 1-2. Storage unit 24 may be for storing password 20 and the mnemonic combination 22 association with the password. Storage unit 24 may be any device capable of storing passwords and mnemonic combinations. Storage unit 24 may also be for storing computer program 18. In one embodiment, storage unit 24 may be for storing a plurality of passwords 20 and a plurality of mnemonic combinations 22. In this embodiment, each of the passwords 20 may be associated with one of the mnemonic combinations 22. The computer program may then be adapted to allow a user to create each of the plurality of passwords and each of the mnemonic combinations associated with the passwords. In this plurality of passwords and mnemonic combinations embodiment, when the user enters one of the mnemonic combinations 22 into the user interface 26, the electronic key may communicate the password 20 associated with the entered mnemonic combination 22 to the computer device 14 as a human input device. In one embodiment, the storage unit may be a CPU chip provided by Atmel Corp. under the product name ATmega32U4. In another embodiment, the storage unit may be a CPU chip provided by Atmel Corp. under the product name AT90USB1286. The notable differences between the two storage unit embodiments from Atmel Corp. is the amount of EEPROM bytes, Flash bytes, and I/O pins available. In these two embodiments of the storage unit, the CPU chip is the central and only silicon chip. The other components of the key 10 may include various resistors, capacitors, switches, and the user interface, like a 7-segment 4-digit LED display (as shown in FIG. 1).

User interface 26 may be included in electronic key 10 for entering computer related passwords via a mnemonic combination. See FIGS. 1-2. User interface 26 may be for allowing a user to enter the mnemonic combination 22 into electronic key 10. User interface 26 may be any device for allowing a user to enter a combination into key 10. User interface 26 may be chosen based on the desired mnemonic combination. For example, if the desired mnemonic combination is a PIN number combination 34, user interface 26 may include a numerical interface only. As another example, if the desired mnemonic combination is gestures 42, user interface 26 may include a touch screen where a gesture type combination may be swiped onto the touch screen. The touch screen may be utilized to allow the entry of data on the device as direct input or as gestures. In another embodiment, a camera may be included with the user interface 26 to detect gestures/face/heat signatures/etc. as the mnemonic combination. In another embodiment, the user interface may allow the user to define symbols or pictures as input for the mnemonic. In this embodiment, the user may be prompted to choose from a series of symbols with the elements of the mnemonic contained therein. This would allow for mnemonic combinations other than alpha-numeric combinations.

Referring to the embodiment shown in FIG. 1, key 10 may be provided with a numeric display 44 adapted for allowing the mnemonic combination 22 to be a PIN number 34. However, the invention is not so limited and the numeric display 44 could be other desired user interfaces, like alpha-numeric displays, touch screens, graphical displays, etc., as exemplified in the paragraph above. In the embodiment shown in FIG. 1, the user interface 26 may include a numeric display 44 and a plurality of switches 46 adapted for allowing the user to enter the PIN number 34 into the numeric display 44. In this embodiment, the numeric display may be any numeric display, including, but not limited to: an OLED display 48, an LED display 50, or an LCD display 52. The plurality of switches may be adapted for allowing a user to control the number displayed in the numeric display 44. For example, switch 46a may cycle through the numbers 0-9 of the first digit of the numerical display, switch 46c may cycle through the numbers 0-9 of the second digit, switch 46b may cycle through the numbers 0-9 of the third digit, and switch 46d may cycle through the numbers of the fourth digit.

Figure 3:
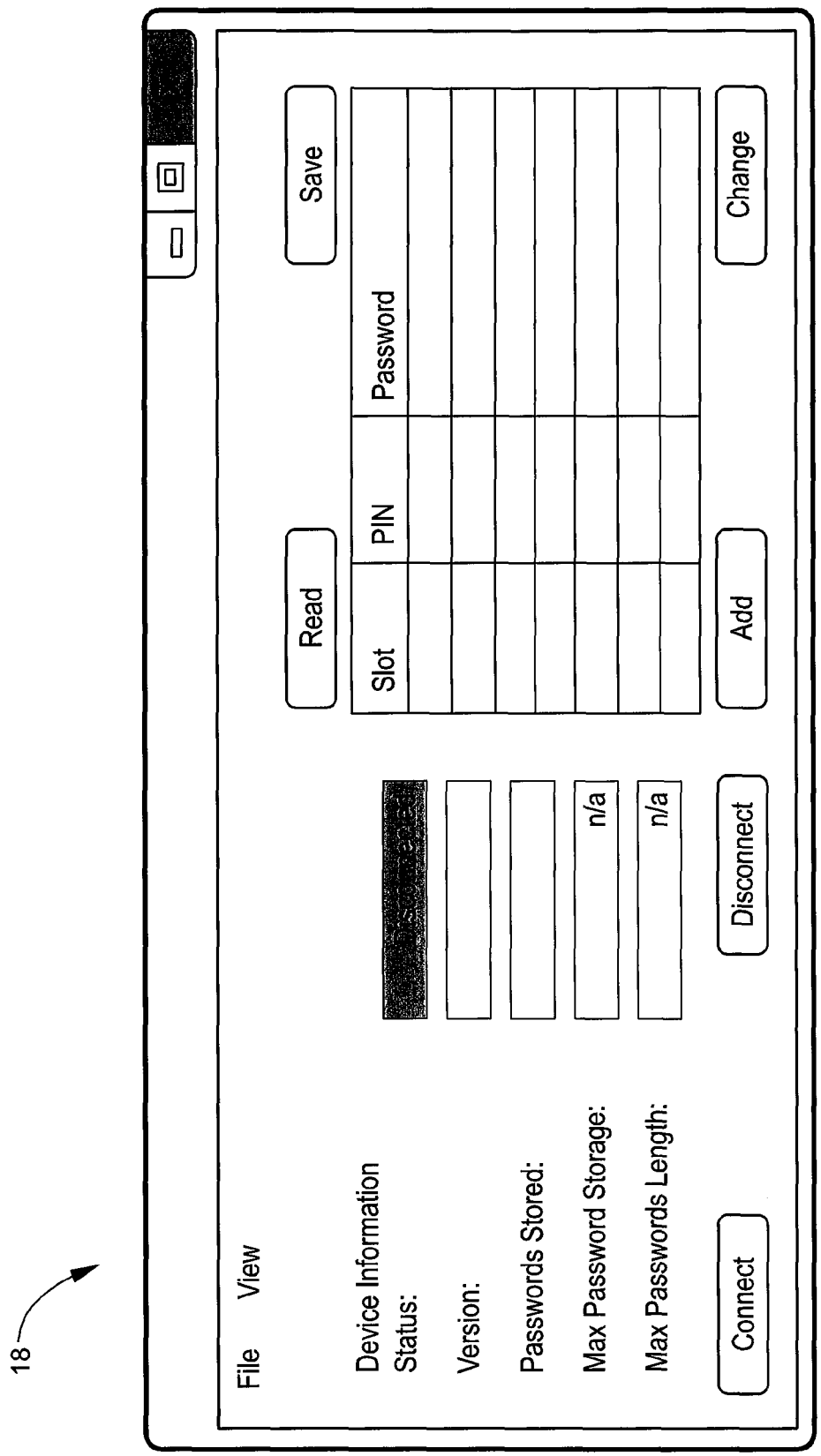
FIG. 3 is a screen shot of one embodiment of the computer program being disconnected.
Figure 4:
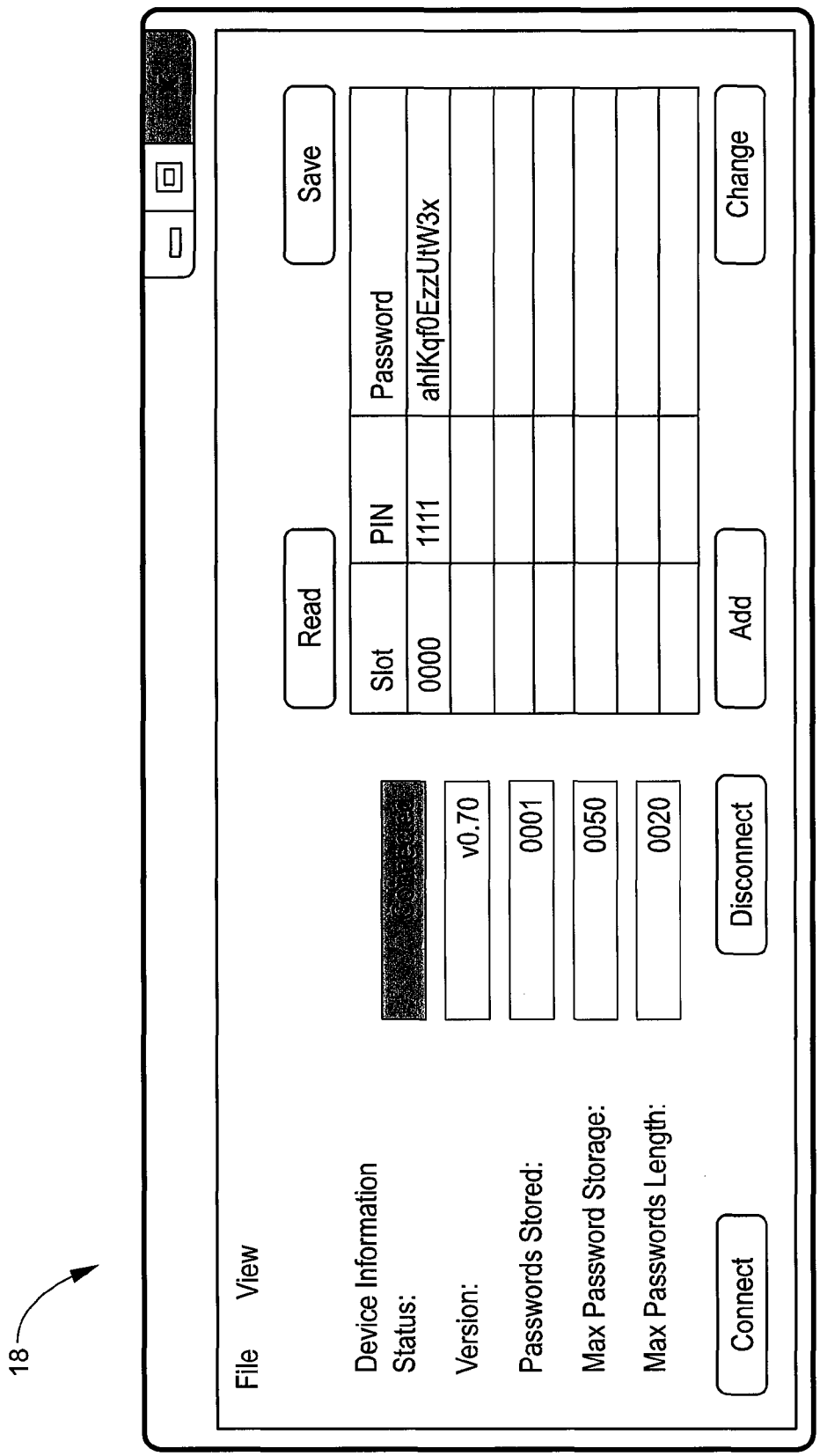
FIG. 4 is a screen shot of the computer program of FIG. 3 being connected with a password and associated PIN positioned in slot 0000.
Figure 5:
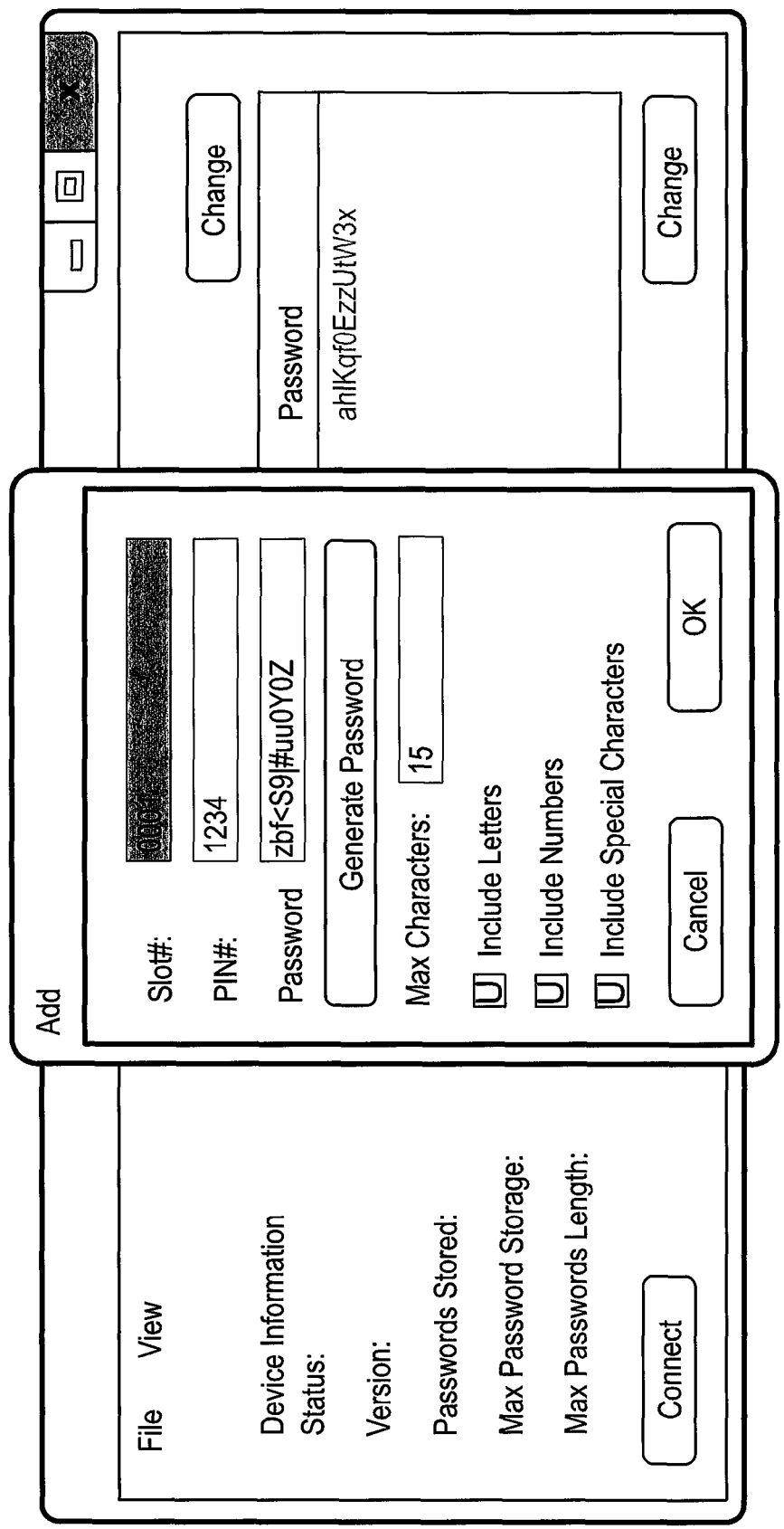
FIG. 5 is a screen shot of the computer program of FIG. 3 generating a random password for an associated PIN positioned in slot 0001.
Figure 6:
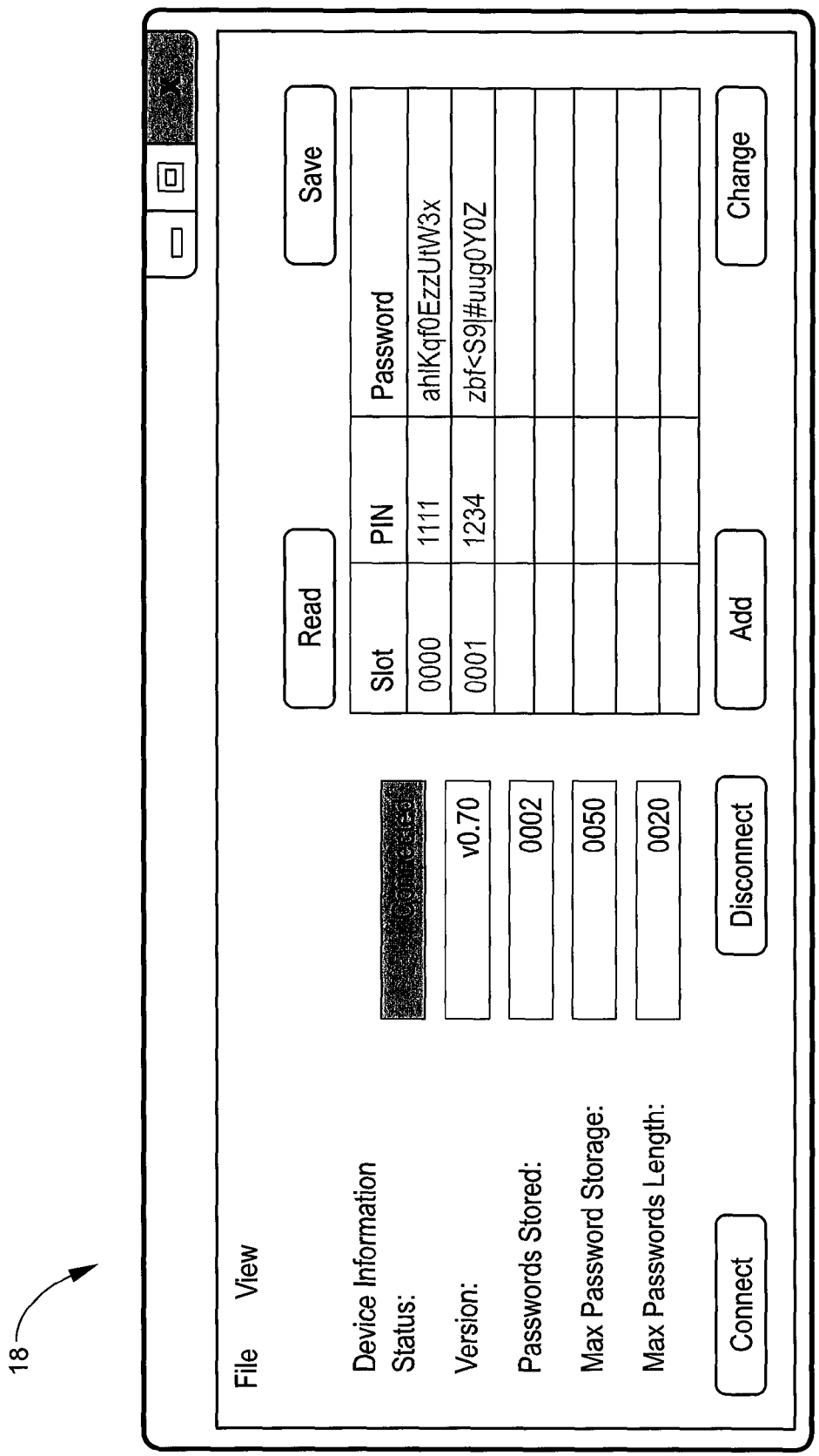
FIG. 6 is a screen shot of the computer program of FIG. 3 being connected with a password and associated Pin positioned in slots 0000 and 0001.
Figure 7:
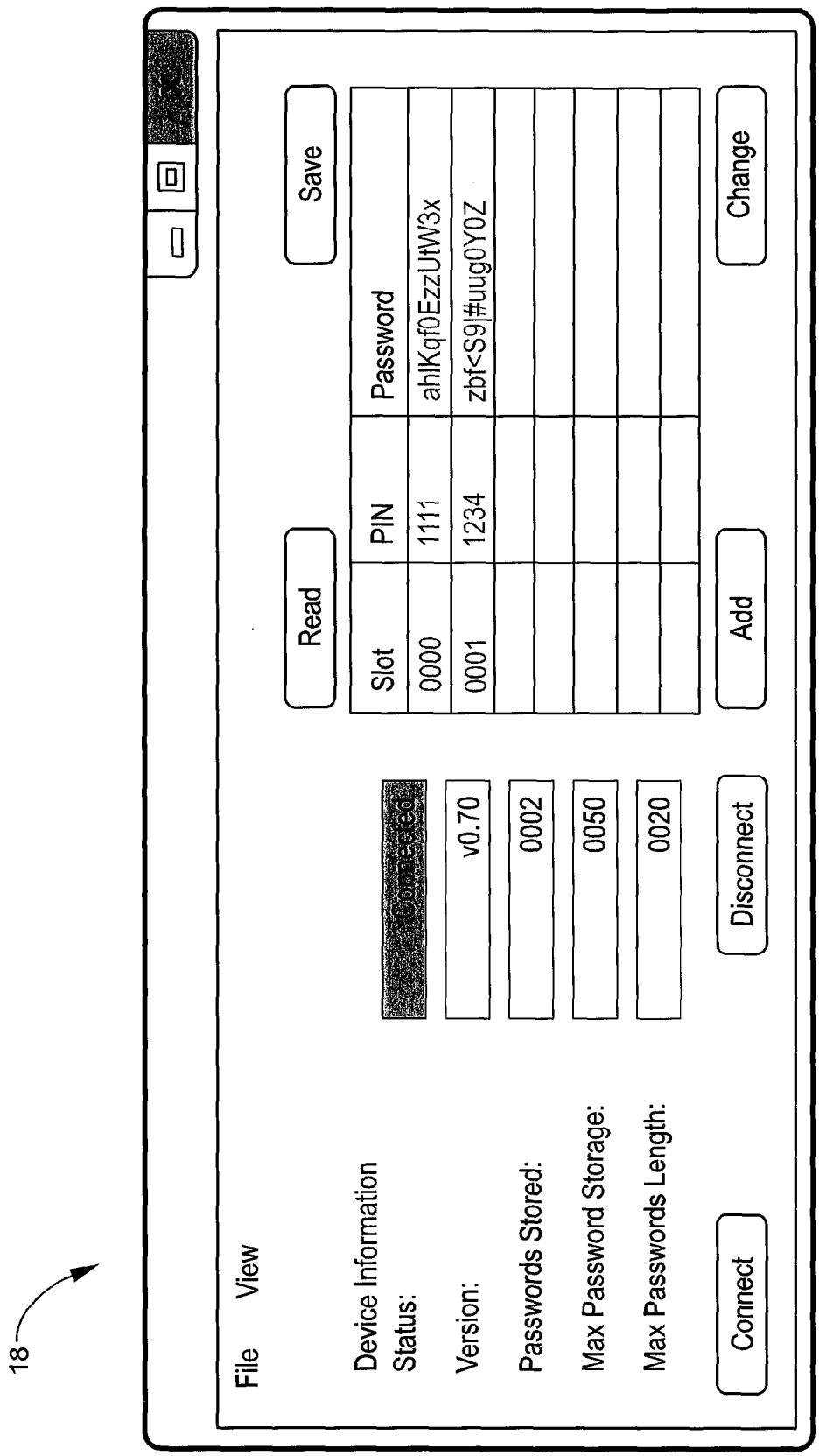
FIG. 7 is a screen shot of the computer program of FIG. 3 being connected with a password and associated Pin positioned in slots 0000 and 0001.

In operation, key 10 may first be used to create a password 20 (or a plurality of passwords 20) and a mnemonic combination 22 (or a plurality of combinations 22) associated with the password 20. The creation of password 20 and mnemonic combination 22 may be done via computer program 18, as shown in the embodiment of computer program 18 in FIGS. 3-7. Key 10 must first be connected to a computer device 14 via communication means 12. In one embodiment, once the key 10 is connected to computer device 14, computer program 18 may still not operate or it may be still shown as disconnected until a programming combination is entered into the user interface. This programming code will enter the key into "programming mode" (programming mode may allow the PC software to configure the operating parameters of the device) where the key opens up a 2-way communication with the computer device. This 2-way communication with the computer could be a USB serial connection, or it could be enhanced to utilize a USB HID profile or as a Bluetooth serial device or other like methods. Once connected and in the programming mode (if required, the user can click on the "Connect" button as shown in FIG. 3. Once the device is connected, then the user would click on the "Read" button. The screen shot shown in FIG. 4 may be displayed when there is a valid connection with the device and the contents of the device have been read successfully. The screen shot shown in FIG. 5 may be used when the user selects "Add" or "Change". This allows the user to add/change the password date contained in the device. In the embodiment of the computer program shown in FIG. 5, the computer program allows the user to enter a mnemonic combination (PIN# as shown in the Figures) and create a password associated with each mnemonic combination (see FIG. 5). The user can either enter a user defined password 20b or have the computer program 18 create a random password 20b for each mne-monic combination by clicking on the "Generate Password" link. The password created can be generated based on the criteria selected by the user, i.e. include letter, include numbers, include special characters, etc. Once the password has been generated, the computer program may display a list of the mnemonic combinations (PIN#s) and their associated passwords (see FIG. 6). Once displayed, the user can click the "Save" link, at which point the passwords and mnemonic combinations will be saved on the electronic key 10 (as shown in FIG. 7).

After the password and mnemonic combinations have been saved on electronic key 10, key 10 may then be disconnected from computer device 10. Key 10 may then be transported to any desired computer device 14. Key 10 may be transported easily in ones pocket, wallet, on a key chain or by any other means.

Once at a desired computer device 14, key 10 may then be utilized for entering a computer password onto the desired computer device 14 by entering a mnemonic combination into the user interface 26 on the key 10. First, a connection must be established between the electronic key 10 and the computer device 14 as a HID (keyboard device). This may be wired connection 28 (USB) or wireless connection 30 (Bluetooth). These connections are made by any means known by one skilled in the art. Once connected, the user may enter the cursor of the computer into the desired field that the password is to be entered into. Once the cursor is in position, the user may then enter the mnemonic combination 22 into the user interface 26 on key 10. Once the mnemonic combination 22 is entered into the user interface, the key 10 may communicate with the computer device 14 as a HID (keyboard device) and enter the associated password into the desired field where the cursor is positioned.

As should be understood by one skilled in the art, the instant invention of an electronic key 10 for entering computer related passwords via a mnemonic combination may include countless features for making the device easier and safer to operate. For example, electronic key 10 may include an option to wipe the data storage (passwords and combinations) upon a specified number of initial password or mnemonic entry failures. As another example, the electronic key may include an option to wipe the data storage upon some combination of key presses on the device. As yet another example, the user interface 26 and the storage unit 24 could be separate units. This embodiment may allow a user to leave the user interface 26 connected to a PC at all times. The user could then carry around the storage unit 24 only. When the storage unit 24 may be connected to the stationary user interface 26, then the device would activate and operate as described above. This embodiment may be more convenient as it minimizes the amount of technology the user would have to carry with them.

Figure 2:
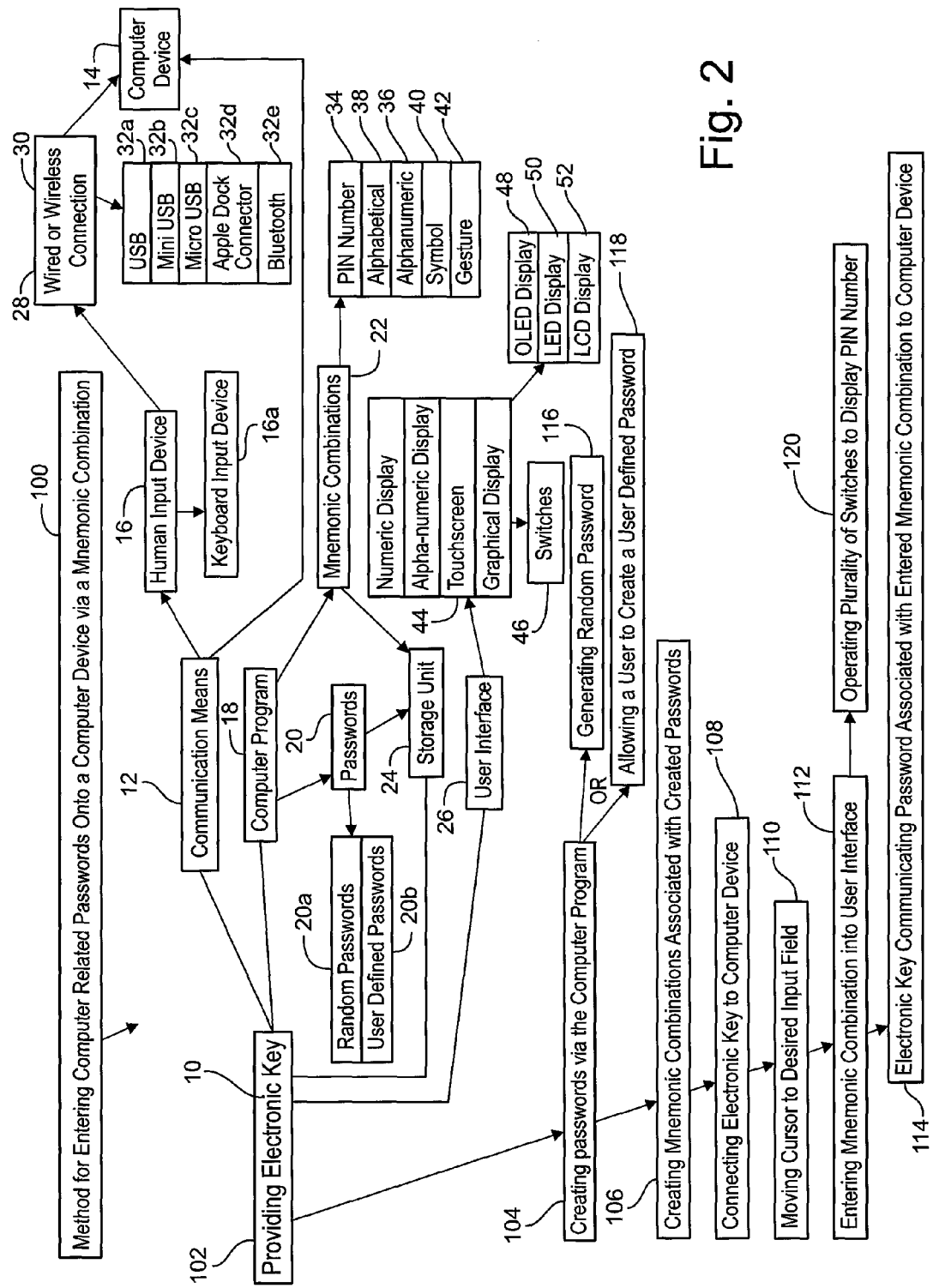
FIG. 2 is a flow chart a method for entering computer related passwords onto a computer device via a mnemonic combination according to one embodiment of the instant invention.

Referring to FIG. 2, the instant includes a method 100 for entering computer related passwords onto a computer device via a mnemonic combination. Method 100 may be for utilizing the electronic key 10 described above to enter a computer related password into a computer device 14 via entering a mnemonic combination 22 into key 10. Method 100 generally includes: a step 102 of providing electronic key 10; a step 104 of creating a password via computer program 18; a step 106 of creating a mnemonic combination 22 associated with the created password 20; a step 108 of connecting electronic key 10 to computer device 14; a step 110 of moving the cursor to a desired input field; a step 112 of entering the mnemonic combination 22 into the user interface 26; and a step 114 of the electronic key 10 communicating the password associated with the entered mnemonic combination to the computer device 14 in the desired input field.

Step 102 of providing electronic key 10 may be included in method 100 for entering computer related passwords onto a computer device via a mnemonic combination. See FIG. 2. Step 102 may include any steps for providing electronic key 10. The electronic key 10 provided in step 102 may be as described herein above.

Step 104 of creating passwords via the computer program 18 may be included in method 100 for entering computer related passwords onto a computer device via a mnemonic combination. See FIG. 2. Step 104 may include any steps for creating passwords 290 via computer program 18. In one embodiment, step 104 may include a step 116 of generating a random password 20a associated with the mnemonic combination (see FIG. 5). In another embodiment, step 104 may include a step 118 of allowing a user to create a user defined password 20b associated with the mnemonic combination (see FIG. 5).

Step 106 of creating mnemonic combination 22 associated with created password 20 via computer program 18 may be included in method 100 for entering computer related passwords onto a computer device via a mnemonic combination. See FIG. 2. Step 106 may include any steps for creating mnemonic combination 22 with computer program 18. The mnemonic combination created in step 106 may include, but is not limited to: a PIN number combination, an alpha-numeric combination, a symbol combination, a gesture combination, other like combinations, and combinations thereof.

Step 108 of connecting electronic key 10 to computer device 14 may be included in method 100 for entering computer related passwords onto a computer device via a mnemonic combination. See FIG. 2. Step 108 may include any steps for connecting electronic key 10 to computer device 14. Step 108 may include establishing a wired connection 28 and/or a wireless connection 30, including but not limited to, USB 32a (including standard USB, Mini USB 32b, Micro USB 32c, and Apple Dock Connector 32d), other like wired connections, Bluetooth 32e, other like wireless connections, or any combination thereof.

Step 110 of moving the cursor to a desired input field may be included in method 100 for entering computer related passwords onto a computer device via a mnemonic combination. See FIG. 2. Step 110 may include any steps for moving the cursor to the desired input field, as commonly known by one skilled in the art.

Step 112 of entering mnemonic combination 22 into user interface 26 may be included in method 100 for entering computer related passwords onto a computer device via a mnemonic combination. See FIG. 2. Step 112 may include any steps for entering mnemonic combination 22 into user interface 26. Step 112 may include entering any type of mnemonic combination 22, including, but not limited to, a PIN number combination 34, an alphabetical combination 38, an alpha-numeric combination 36, a symbol combination 40, a gesture combination 42, other like combinations, and combinations thereof. As should be understood by one skilled in the art, the actions required for step 112 may vary depending on the mnemonic combination and the user interface provided.

Step 114 of the electronic key 10 communicating the password 20 associated with the entered mnemonic combination 22 to the computer device 14 in the desired input field may be included in method 100 for entering computer related passwords onto a computer device via a mnemonic combination. See FIG. 2. Step 114 may include any steps required for the electronic key 10 to communicate the password. Theses steps may be carried out via computer program 18.

In one embodiment of method 100, when using the key shown in FIG. 1 where the mnemonic combination 22 being a PIN number and the user interface including a numeric display 44, the step 112 of entering the mnemonic combination into the user interface 26 may include a step 120 of operating the plurality of switches 46 to display the PIN number on the numeric display. Once the PIN number is displayed on the numeric display, electronic key 10 may then carry out step 114 of communicating the password to the computer device 14. In other embodiments, the plurality of switches 46 may be used to allow the user to enter other types of mnemonic combinations, like a numeric keypad or alpha-numeric keyboard.

The present invention may be embodied in other forms without departing from the spirit and the essential attributes thereof, and, accordingly, reference should be made to the appended claims, rather than to the foregoing specification, as indicated in the scope of the invention.

I claim:

1. A key for entering computer related passwords via a mnemonic combination comprising:
    an electronic key comprising:
    a communication interface being for communicating with a computer device where said computer device recognizing said key as a human input device having a USB HID profile or a Bluetooth HID profile;
    a computer program being for creating a password and a mnemonic combination being associated with said password;
    a storage unit being for storing said password and said mnemonic combination association with said password; and
    a user interface being for allowing a user to enter said mnemonic combination into said electronic key;
    wherein, when a user moves a curser of the computer device to a desired field and the user enters said mnemonic combination into said user interface, said electronic key communicating said password associated with said mnemonic combination into said desired field as a human input device having said USB HID profile or said Bluetooth HID profile.

2. The key for entering computer related passwords via a mnemonic combination of claim 1 wherein said human input device having said USB HID profile or said Bluetooth HID profile being a keyboard input device having said USB HID profile or said Bluetooth HID profile.

3. The key for entering computer related passwords via a mnemonic combination of claim 1 wherein said communication means including a wired or wireless interface and combinations thereof.

4. The key for entering computer related passwords via a mnemonic combination of claim 3 wherein said communication means being selected from the group consisting of: USB, Mini USB, Micro USB, Apple Dock Connector, Bluetooth, and combinations thereof.

5. The key for entering computer related passwords via a mnemonic combination of claim 1 wherein said computer program being adapted to generate a random password said mnemonic combination.

6. The key for entering computer related passwords via a mnemonic combination of claim 1 wherein said computer program being adapted for allowing a user to create a user defined password for said mnemonic combination.

7. The key for entering computer related passwords via a mnemonic combination of claim 1 wherein said mnemonic combination being selected from the group consisting of: a PIN number combination, alphabetical combination, an alpha-numeric combination, a symbol combination, a gesture combination, and combinations thereof.

8. The key for entering computer related passwords via a mnemonic combination of claim 7 wherein:
said mnemonic combination being a PIN number;
said user interface including a numeric display and a plurality of switches adapted for allowing the user to enter said PIN number into said numeric display; and
said numeric display being selected from the group consisting of: an OLED display, an LED display, or an LCD display.

9. The key for entering computer related passwords via a mnemonic combination of claim 1 wherein said electronic key may be adapted to allow a user to create a password associated with a mnemonic combination whereby said key may be utilized to communicate with the computer device as said human input device having said USB HID profile or said Bluetooth HID profile and enter said password into said computer device upon the user entering said mnemonic combination into said user interface.

10. The key for entering computer related passwords via a mnemonic combination of claim 1 wherein:
said storage unit being for storing a plurality of passwords and a plurality of mnemonic combinations, where each of said passwords being associated with one of said mnemonic combinations; and
said computer program being adapted to allow a user to create each of said passwords and each of said mnemonic combinations associated with said passwords;
whereby, when the user enters one of said mnemonic combinations into said user interface, said electronic key communicating said password associated with said mnemonic combination to said computer device as said human input device having said USB HID profile or said Bluetooth HID profile.

11. A method for entering computer related passwords onto a computer device via a mnemonic combination comprising the steps of:
providing an electronic key comprising:
a communication interface being for communicating with a computer device where said computer device recognizing said key as a human input device having a USB HID profile or a Bluetooth HID profile;
a computer program being for creating a password and a mnemonic combination being associated with said password;
a storage unit being for storing said password and said mnemonic combination association with said password; and
a user interface being for allowing a user to enter said mnemonic combination into said electronic key;
creating said password via said computer program;
creating said mnemonic combination associated with said password via said computer program;
connecting said electronic key to said computer device;
moving the cursor to a desired input field; and
entering said mnemonic combination into said user interface; whereby, when a user moves the curser of the computer device to said desired field and the user enters said mnemonic combination into said user interface, said electronic key communicating said password associated with said mnemonic combination into said desired field as a human input device having said USB HID profile or said Bluetooth HID profile.

12. The method for entering computer related passwords onto a computer device via a mnemonic combination of claim 11 wherein said human input device having said USB HID profile or said Bluetooth HID profile being a keyboard input device having said USB HID profile or said Bluetooth HID profile.

13. The method for entering computer related passwords onto a computer device via a mnemonic combination of claim 11 wherein said communication means including a wired or wireless interface and combinations thereof.

14. The method for entering computer related passwords onto a computer device via a mnemonic combination of claim 13 wherein said communication means being selected from the group consisting of: USB, Mini USB, Micro USB, Apple Dock Connector, Bluetooth, and combinations thereof.

15. The method for entering computer related passwords onto a computer device via a mnemonic combination of claim 11 wherein said step of creating said password via said computer program including a step of generating a random password associated with said mnemonic combination.

16. The method for entering computer related passwords onto a computer device via a mnemonic combination of claim 11 wherein said step of creating said password via said computer program including a step of allowing a user to create a user defined password associated with said mnemonic combination.

17. The method for entering computer related passwords onto a computer device via a mnemonic combination of claim 11 wherein said mnemonic combination being selected from the group consisting of: a PIN number combination, an alpha-numeric combination, a symbol combination, a gesture combination, and combinations thereof.

18. The method for entering computer related passwords onto a computer device via a mnemonic combination of claim 17 wherein:
said mnemonic combination being a PIN number;
said user interface including a numeric display and a plurality of switches adapted for allowing the user to enter said PIN number into said numeric display; and
said numeric display being selected from the group consisting of: an OLED display, an LED display, or an LCD display;
whereby, said step of entering said mnemonic combination into said user interface including a step of operating said plurality of switches to display said PIN number on said numeric display.

19. The method for entering computer related passwords onto a computer device via a mnemonic combination of claim 11 wherein said electronic key may be adapted to allow a user to create a password associated with a mnemonic combination whereby said key may be utilized to communicate with the computer device as said human input device having said USB HID profile or said Bluetooth HID profile and enter said password into said computer device upon the user entering said mnemonic combination into said user interface.

20. The method for entering computer related passwords onto a computer device via a mnemonic combination of claim 11 wherein:
said storage unit being for storing a plurality of passwords and a plurality of mnemonic combinations, where each of said passwords being associated with one of said mnemonic combinations; and
said computer program being adapted to allow a user to create each of said passwords and each of said mnemonic combinations associated with said passwords;
wherein, said step of creating said password via said computer program including a plurality of steps for creating each of said plurality of passwords; and
said step of creating said mnemonic combination associated with said password via said computer program including a plurality of steps for creating each of said plurality of mnemonic combinations associated with said plurality of passwords created;

whereby, when the user enters one of said mnemonic combinations into said electronic key, said electronic key communicating said password associated with said mnemonic combination to said computer device as said human input device having said USB HID profile or said Bluetooth HID profile.

* * * * *